(12) United States Patent
Sundararajan et al.

(10) Patent No.: US 12,199,722 B2
(45) Date of Patent: Jan. 14, 2025

(54) INTERFERER IDENTIFICATION USING NULL RESOURCE PATTERN

(71) Applicant: QUALCOMM Incorporated, San Diego, CA (US)

(72) Inventors: Jay Kumar Sundararajan, San Diego, CA (US); Yeliz Tokgoz, San Diego, CA (US); Naga Bhushan, San Diego, CA (US); June Namgoong, San Diego, CA (US); Hwan Joon Kwon, San Diego, CA (US); Taesang Yoo, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/464,570

(22) Filed: Sep. 1, 2021

(65) Prior Publication Data

US 2023/0073510 A1 Mar. 9, 2023

(51) Int. Cl.
*H04B 17/345* (2015.01)
*H04B 7/06* (2006.01)
(Continued)

(52) U.S. Cl.
CPC ......... *H04B 7/0632* (2013.01); *H04B 17/345* (2015.01); *H04L 5/0048* (2013.01);
(Continued)

(58) Field of Classification Search
CPC .... H04B 17/345; H04B 7/0632; H04W 48/12
See application file for complete search history.

(56) References Cited

U.S. PATENT DOCUMENTS

2010/0099428 A1* 4/2010 Bhushan ............. H04J 11/0059
455/63.1
2012/0113850 A1* 5/2012 Fu ...................... H04W 72/542
370/252

(Continued)

OTHER PUBLICATIONS

Fatemeh Arbabjolfaei; Young-Han Kim, Fundamentals of Index Coding , now, 2018, doi: 10.1561/0100000094. (Year: 2018) (Year: 2018).*

(Continued)

*Primary Examiner* — Joseph A Bednash
(74) *Attorney, Agent, or Firm* — Procopio, Cory, Hargreaves & Savitch

(57) ABSTRACT

A second base station may allocate a set of downlink resources for a downlink transmission. The set of downlink resources may include a subset of null resources, which may serve as a signature for the second base station. The second base station may transmit downlink data or reference signals on the set of downlink resources including the subset of null resources. A first UE may experience the downlink transmission from the second base station as interference. The first UE may identify the set of downlink resources. The first UE may identify the subset of null resources. The first UE may transmit, to a first base station, an indication of the subset of null resources. The first base station may identify the second base station based on the indication of the subset of null resources. The first base station may transmit, to the second base station, an interference coordination message.

30 Claims, 12 Drawing Sheets

(51) Int. Cl.
*H04L 5/00* (2006.01)
*H04L 25/02* (2006.01)
*H04L 25/03* (2006.01)
*H04W 48/12* (2009.01)

(52) U.S. Cl.
CPC .... *H04L 25/0224* (2013.01); *H04L 25/03006* (2013.01); *H04W 48/12* (2013.01)

(56) References Cited

U.S. PATENT DOCUMENTS

| | | |
|---|---|---|
| 2012/0155291 A1 | 6/2012 | Koivisto et al. |
| 2013/0021929 A1* | 1/2013 | Kim ............... H04W 76/15 370/332 |
| 2013/0279350 A1 | 10/2013 | Erickson et al. |
| 2015/0036616 A1* | 2/2015 | Lee ............... H04W 72/23 370/329 |
| 2016/0286404 A1* | 9/2016 | Rico Alvarino ..... H04B 17/345 |
| 2017/0288848 A1* | 10/2017 | Lei ............... H04L 7/0054 |
| 2021/0105785 A1* | 4/2021 | Manolakos ......... H04W 72/541 |

OTHER PUBLICATIONS

International Search Report and Written Opinion—PCT/US2022/039090—ISA/EPO—Nov. 8, 2022.

* cited by examiner

INTERFERER IDENTIFICATION USING NULL RESOURCE PATTERN

TECHNICAL FIELD

The present disclosure relates generally to communication systems, and more particularly, to identification of an interfering transmitter in a wireless communication system for the purpose of interference coordination.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The apparatus may identify a set of downlink resources for a downlink transmission from a second base station, the set of downlink resources including at least one subset of null resources. The apparatus may estimate one or more interference statistics for each downlink resource in the set of downlink resources from the second base station. The apparatus may transmit, to a first base station based on the one or more interference statistics, an indication of the at least one subset of null resources in the set of downlink resources.

In an aspect of the disclosure, a method, a computer-readable medium, and an apparatus are provided. The apparatus may be a base station. The apparatus may receive, from a first UE, an indication of at least one subset of null resources in a set of downlink resources from a second base station, the set of downlink resources being associated with a downlink transmission from the second base station. The apparatus may identify the second base station based on the indication of the at least one subset of null resources included in the set of downlink resources. The apparatus may transmit, to the second base station, an interference coordination message associated with the at least one subset of null resources included in the set of downlink resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
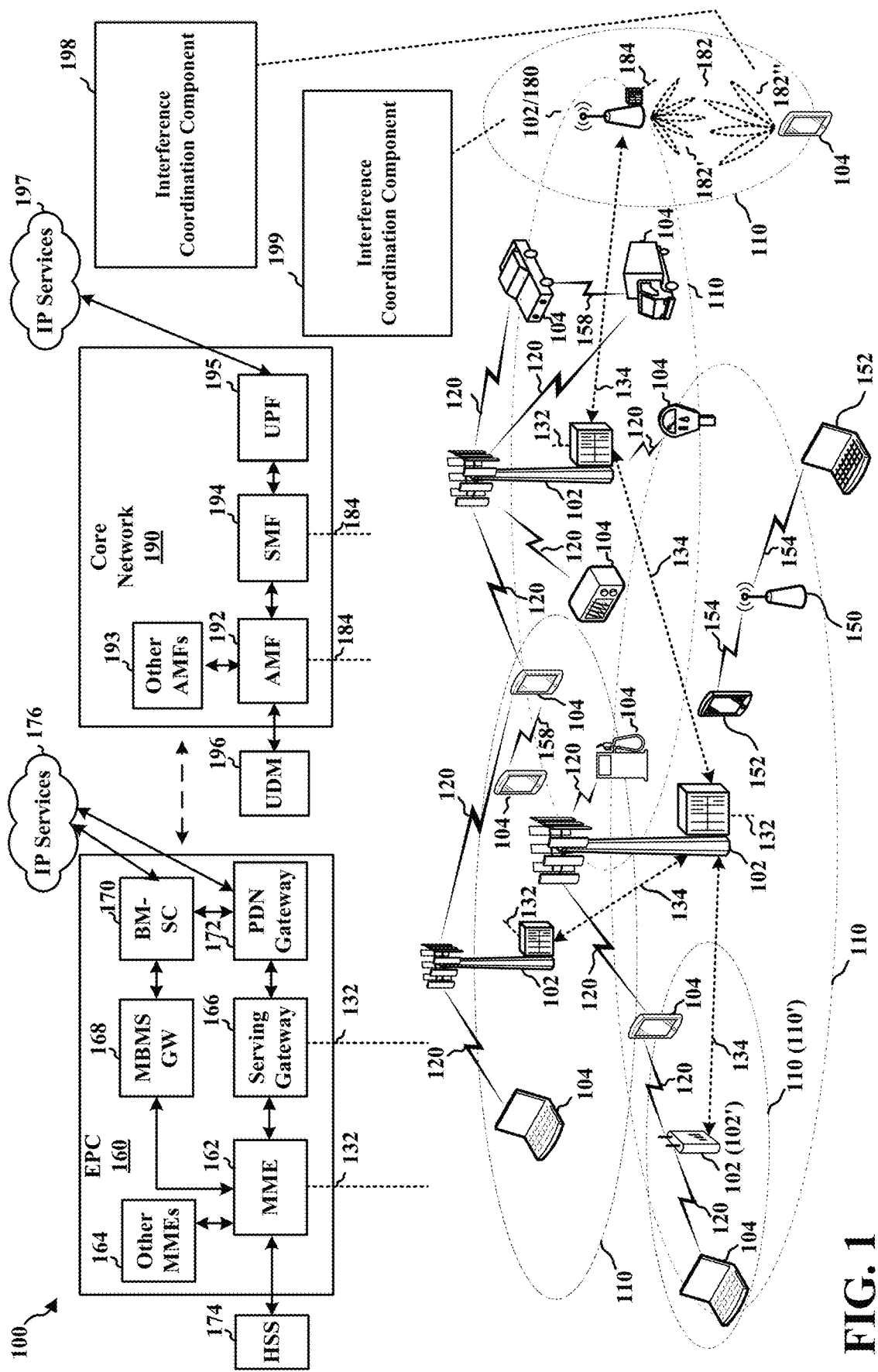
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first UE 104 may include an interference coordination component 198 that may be configured to identify a set of downlink resources for a downlink transmission from a second base station, the set of downlink resources including at least one subset of null resources. The interference coordination component 198 may be configured to estimate one or more interference statistics for each downlink resource in the set of downlink resources from the second base station. The interference coordination component 198 may be configured to transmit, to a first base station based on the one or more interference statistics, an indication of the at least one subset of null resources in the set of downlink resources. In certain aspects, the first base station 180 may include an interference coordination component 199 that may be configured to receive, from a first UE, an indication of at least one subset of null resources in a set of downlink resources from a second base station, the set of downlink resources being associated with a downlink transmission from the second base station. The interference coordination component 199 may be configured to identify the second base station based on the indication of the at least one subset of null resources included in the set of downlink resources. The interference coordination component 199 may be configured to transmit, to the second base station, an interference coordination message associated with the at least one subset of null resources included in the set of downlink resources. Although the following description may be focused on 5G NR, the concepts described herein may be applicable to other similar areas, such as LTE, LTE-A, CDMA, GSM, and other wireless technologies.

Figure 2:
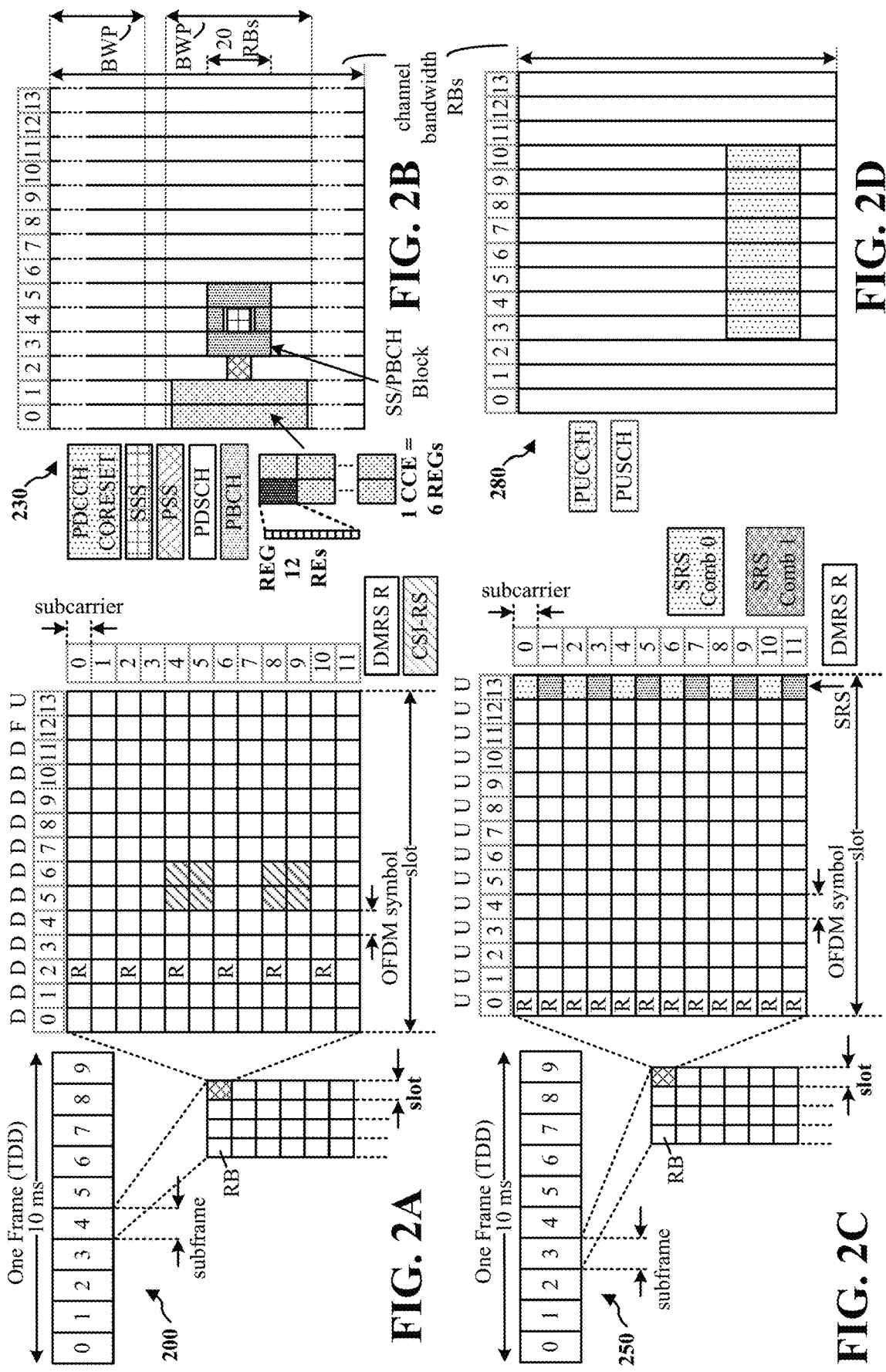
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
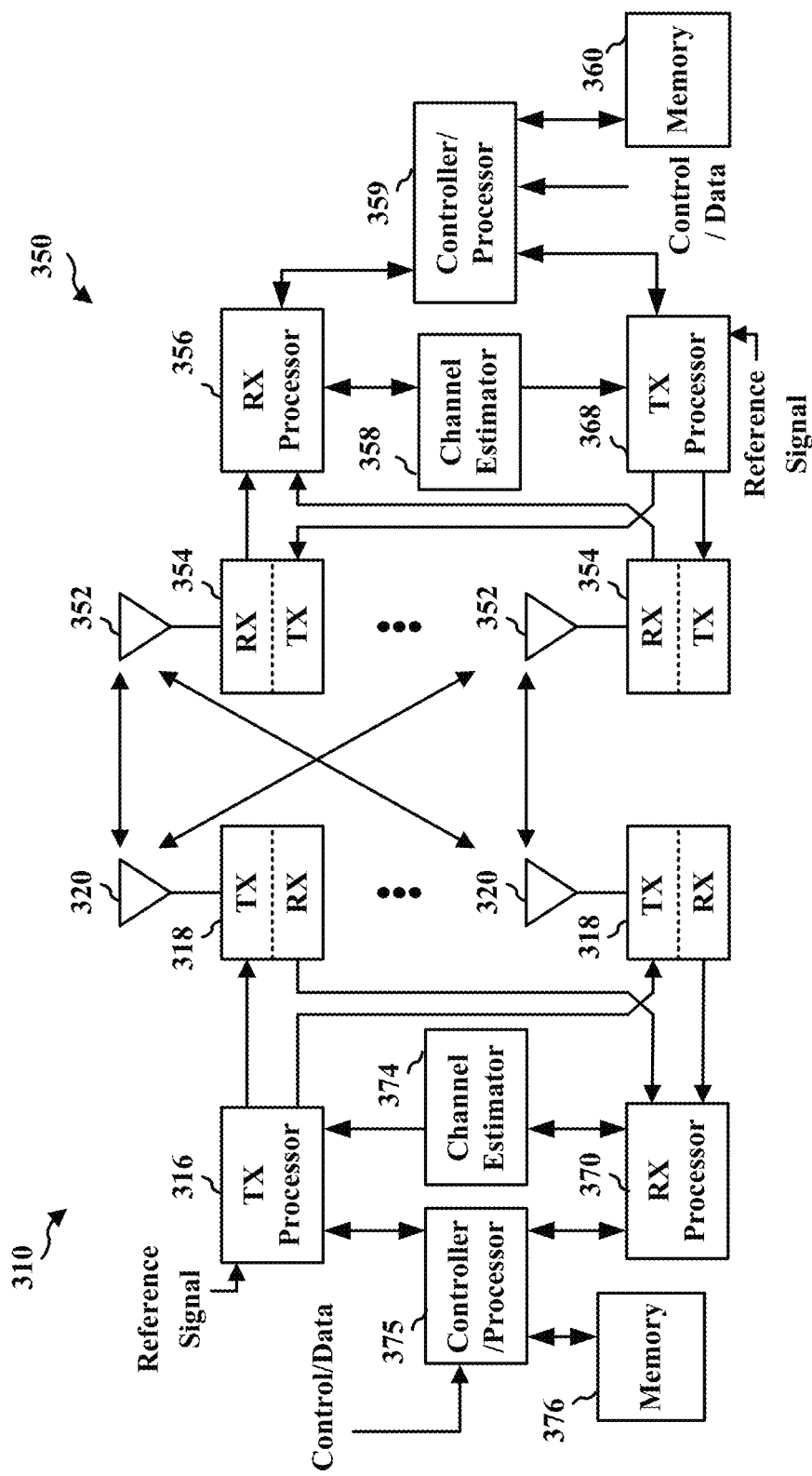
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the interference coordination component 198 of FIG. 1.

At least one of the TX processor 316, the RX processor 370, and the controller/processor 375 may be configured to perform aspects in connection with interference coordination component 199 of FIG. 1.

Figure 4B:
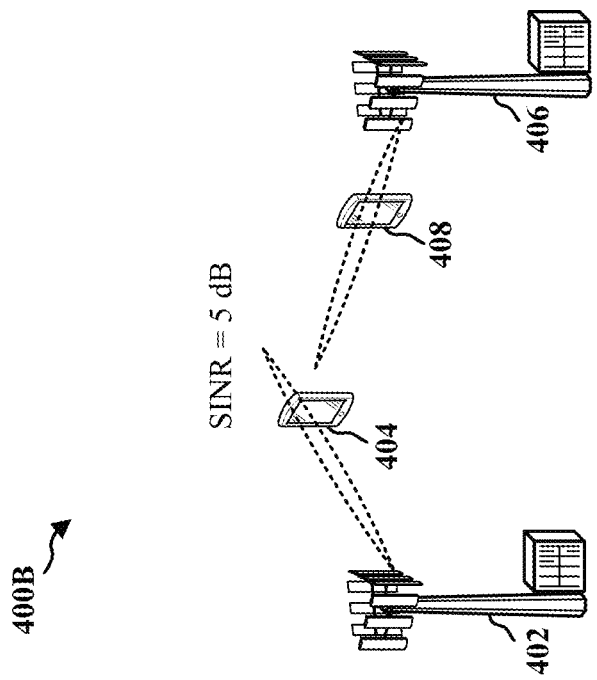
FIGS. 4A and 4B are diagrams illustrating wireless communication systems.
Figure 4A:
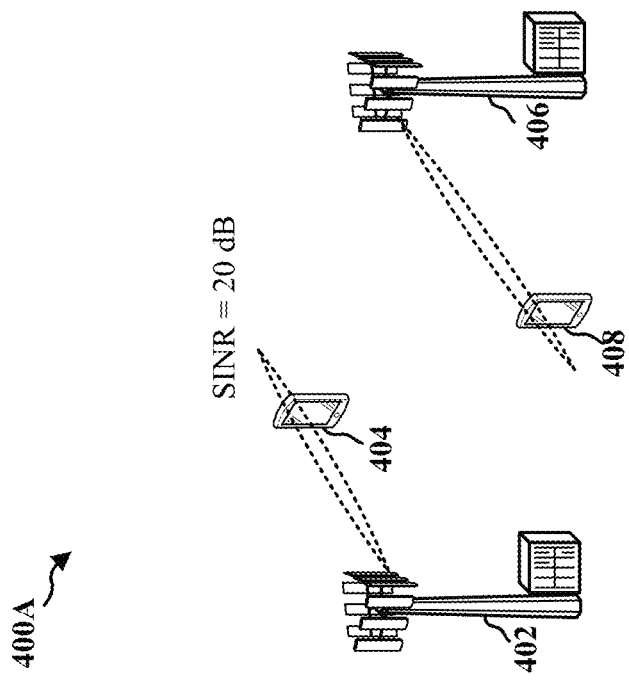

FIGS. 4A and 4B are diagrams 400A and 400B illustrating wireless communication systems. In massive MIMO systems, transmissions may be beamformed. The beams used may be narrow. Depending on the orientation of the UE in relation to the base station and the direction of the beams from the neighboring cell, the level of the interference caused by the neighboring cell at a given UE may vary widely. FIG. 4A illustrates a scenario where a first UE 404 communicating with a first base station 402 may experience minimal interference caused by the communication between a second base station 406 and a second UE 408 because the beam generated by the second base station 406 for communication with the second UE 408 may point in a direction that avoids the first UE 404. Accordingly, the first UE 404 may receive communications from the first base station 402 at a higher signal quality (e.g., the signal-to-interference-plus-noise ratio (SINR) at the first UE 404 may be higher, e.g., at 20 dB). However, if a beam from the neighboring cell is in a direction that points towards the UE, then the UE may experience a high level of interference, a low throughput, and poor user experience. FIG. 4B illustrates a scenario where the first UE 404 communicating with the first base station 402 may experience a high level of interference caused by the communication between the second base station 406 and the second UE 408 because the beam generated by the second base station 406 for communication with the second UE 408 may point directly toward the first UE 404. Accordingly, the first UE 404 may receive communications from the first base station 402 at a lower signal quality (e.g., SINR at the first UE 404 may be lower, e.g., at 5 dB).

To reduce the level of interference caused by the neighboring cell, cells may coordinate their scheduling, and may assign different or non-overlapping time-frequency resources to the UEs (e.g., the UEs 404 and 408). The coordination may be referred to herein as interference coordination. Such coordination may be helpful for delay-sensitive applications such as eXtended Reality (XR), Virtual Reality (VR), or Augmented Reality (AR).

In order to enable interference coordination, a mechanism may be provided to enable the base station or other network entities (e.g., entities in the core network) to identify the inter-cell interference described above. Specifically, the network entity (e.g., a base station or another entity) may identify the set of victim UEs that experience high interference and the base station that is causing the interference. In some configurations, the network entity may identify the beam or precoder used by the interfering base station that results in the high interference. Based on the gathered information, the network entity may initiate scheduling coordination or interference coordination.

The existing channel-state feedback (CSF) framework may include mechanisms for a UE to report an interference level when providing the CQI or other types of feedback based on reference signal measurements. The process of measuring the CQI may not directly provide for the identification of an interfering base station. To identify the interfering base station, different base stations may be arranged to transmit reference signals on different resources, and the UE experiencing interference may collect detailed measurements based on the reference signals in order to identify which base station is causing the interference. The process, however, may incur significant overhead, and may also be time consuming. Accordingly, such a process may not be well-suited for low-latency applications (e.g., XR). Further, the precoding applied by the base stations to the reference signals may not match the precoding applied to data transmissions. A failure to correctly identify the interfering base station may result from the different precoding. Accordingly, a method and mechanism for identifying the interfering base station with more efficiency and accuracy may be provided.

Figure 5A:
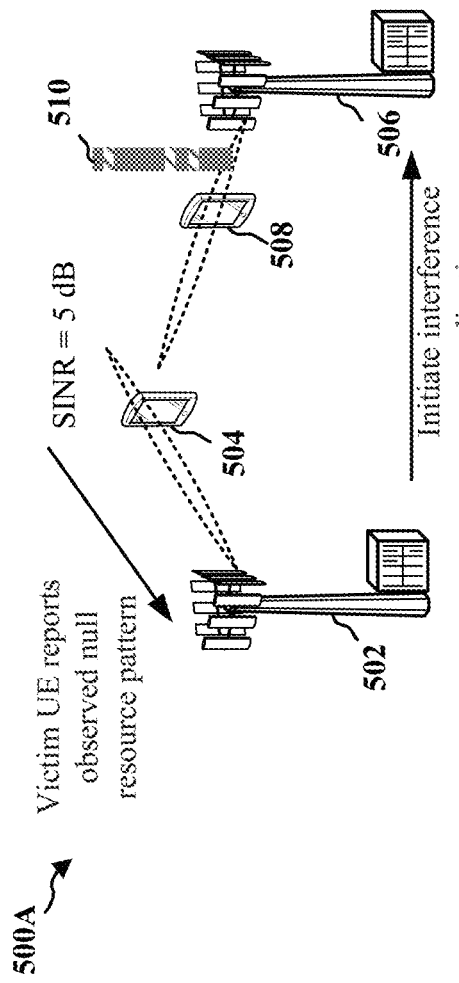
FIG. 5A is a diagram illustrating an example wireless communication system according to aspects of the disclosure.

FIG. 5A is a diagram 500A illustrating an example wireless communication system according to aspects of the disclosure. Each base station may allocate certain resources for downlink transmission towards a UE. The downlink transmission may be a reference signal transmission including a demodulation reference signal (DMRS) or a CSI-RS, or may be a data transmission. The base station may configure a subset of resources within the allocated downlink resources to be null resources, i.e., resources on which no energy is transmitted. In some configurations, the null resources may also include resources that are transmitted with a lower power than other resources. The configuration may be coordinated between the base stations (and possibly other network entities) such that each base station may configure a unique subset of resources to be null resources. The subset of resources that have been configured as null resources may constitute a pattern of null resources, which may be used as a unique signature of the corresponding base station. An index coding method may be used in the selection and allocation of the patterns of null resources, such that individual patterns of null resources may still be identified when multiple patterns of null resources are received together with the patterns of null resources superposed on each other (e.g., when a UE experiences multiple interfering transmissions).

For example, within the downlink transmission 510 (e.g., an interfering downlink transmission) from a second base station 506 (e.g., an interfering base station) to a second UE 508, a subset of downlink resources may be configured by the second base station 506 to be null resources. The pattern of null resources may be unique to the second base station 506, and may thus serve as a signature of the second base station 506. The downlink transmission 510 may cause interference to a first UE 504 because the associated beam may point at the first UE 504. The first UE 504 may be referred to as the victim UE. Based on signal or channel state measurements, the first UE 504 may identify the pattern of null resources contained in the downlink transmission 510 without decoding the downlink transmission 510 (e.g., without decoding the message or the header). In some aspects, the first UE 504 may transmit an indication of the pattern of null resources (e.g., the indices of resources on which the interference power is below a threshold, where the threshold may be derived based on the average interference power across all the resources) to the first base station 502. In some aspects, the first UE 504 may not be able to uniquely identify the pattern of null resources, especially if there is a collision with transmission from another interferer; accordingly, the indication transmitted by the first UE 504 to the first base station 502 may include an estimate of the pattern of null resources. In some aspects, instead of reporting a null resource pattern, the first UE 504 may report one or more statistics for each resource to the first base station 502, and the first base station 502 may infer the pattern of null resources based on the statistics. Based on the association between the pattern of null resources and the second base station 506, which may be known to the first base station 502 (e.g., as a result of inter-base station coordination of null resource patterns), the first base station 502 may identify the second base station 506 based on the indication of the pattern of null resources. Accordingly, the first base station 502 may initiate an interference coordination process with the second base station 506.

In some aspects, the first UE 504 may be preconfigured (e.g., by the network including the first base station 502) with the associations between the patterns of null resources and the base stations (e.g., the associations may be in the form of a lookup table (LUT) that associates patterns of null resources with cell identifiers (IDs)). Instead of transmitting the indication of the pattern of null resources to the first base station 502, the first UE 504 may itself identify the second base station 506 based on the preconfigured associations and the observed pattern of null resources. The first UE 504 may then transmit the identity of the second base station 506 to the first base station 502. Accordingly, the first base station 502 may proceed to initiate the interference coordination process with the second base station 506.

The first UE 504 may identify the pattern of null resources based on one or more measurements of interference statistics on each allocated resource. The interference statistics may include a noise estimation, a total interference power across antennas, an interference covariance matrix, or a CQI, etc. In some configurations, the first UE 504 may identify a null resource when a sufficiently large dip below the average interference power in the interfering transmission is observed.

Figure 5B:
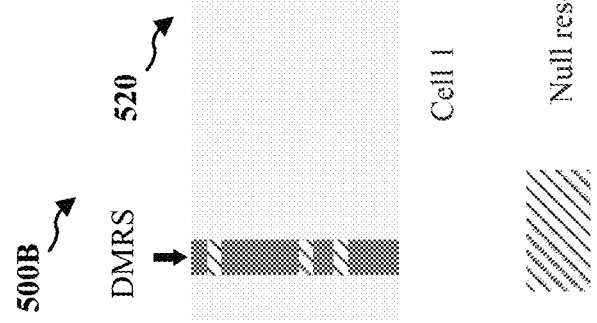
FIG. 5B is a diagram illustrating a number of example downlink transmissions including different patterns of null resources associated with different cells.

FIG. 5B is a diagram 500B illustrating a number of example downlink transmissions including different patterns of null resources associated with different cells. Diagrams 520, 522, and 524 illustrate three downlink transmissions of DMRSs including different patterns of null resources associated with three different cells (e.g., Cell 1, Cell 2, and Cell 3). Although DMRSs are illustrated in FIG. 5B, the disclosure may not be so limited. In different aspects, the downlink transmission may also include a transmission of a different reference signal (e.g., a CSI-RS) or a data transmission.

In one configuration, a base station (e.g., the second base station 506) may further customize the patterns of null resources based on at least one of the precoder, the PMI, the analog beam, or the UE being served (e.g., the second UE 508). In other words, in addition to the interfering base station, the interfering beam or the UE associated with the interfering transmission may also be identified based on the pattern of null resources. In cases where the interfering beam is identified based on the pattern of null resources, the interference coordination process may be based further on the identity of the interfering beam. Identifying individual interfering beams may not be of great assistance when a victim UE is experiencing interference from multiple beams from the same interfering base station.

In one or more configurations, the pattern of null resources may be a time domain pattern, a frequency domain pattern, or a pattern in both domains. In one or more configurations, the pattern of null resources may be at a tone level granularity or a resource block level granularity.

Channel fading may cause fluctuations in the received power across different resources. However, if the interference is strong enough, the resulting received power may still be noticeably higher in the non-null resources compared to the null resources. Accordingly, a deliberately inserted pattern of null resources may be distinguishable from power fluctuations caused by channel fading.

If the interference is not strong enough, then no pattern of null resource may be detected. Accordingly, the UE (e.g., the first UE 504) may not transmit any null resource-related report to the base station (e.g., the first base station 502).

In some configurations, if the victim UE (e.g., the first UE 504) experiences interference simultaneously from multiple neighboring base stations (up to a limit in the number of interfering base stations), the patterns of null resources may still be correctly detected and identified individually, and mapped to the cell IDs of the interfering base stations. In particular, an index coding method may be used in the selection and allocation of the patterns of null resources to enable easier detection and identification, such that individual patterns of null resources may still be identified when multiple patterns of null resources are received together with the patterns of null resources superposed on each other (e.g., when the UE experiences multiple interfering transmissions).

In some configurations, the patterns of null resources may also be used to identify cross-link interferers (e.g., in the context of UE-to-UE or base station-to-base station interference). Base station-to-base station interference may occur when TDD slots at neighboring base stations are not aligned. In particular, the base station may preconfigure the UEs with associations (e.g., in the form of a lookup table) that may map the detected null resource pattern to the identity of an interferer. The UE may then report the identity of the interferer to the base station.

In some configurations, if the interferer is another UE (e.g., a cross-link interference), then the victim UE may initiate interference coordination with the interfering UE over a sidelink channel.

In some configurations, to enable the identification of the UE that is transmitting an interfering uplink or sidelink transmission, the base station may configure each UE with a UE-specific null resource pattern for the purpose of interferer identification. The UE-specific patterns of null resources may be similar to the base station-specific patterns of null resources as described above, except that the UE-specific patterns of null resources may be applied by the UEs to the transmissions from the UEs, and may serve as unique signatures of different UEs. Accordingly, a UE may apply the allocated UE-specific pattern of null resources, and may insert the pattern of null resources in the transmission of reference signals (e.g., SRSs) or data.

Interference coordination may provide significant performance improvements for latency-sensitive applications such as XR. A pair of users may be in a jamming scenario when the first user's serving cell beamforms towards it, and the second user (served by a different cell) experiences a strong interference from the transmission from the cell serving the first user, or vice versa. Orthogonalizing user pairs that were in a jamming scenario may provide a significant increase in the XR frame delivery rate with the delay budget.

Orthogonalizing users at all times may result in lower resource utilization, which may negatively impact performance. Aspects described herein may enable the employment of interference coordination in a controlled manner (e.g., when a jamming scenario is detected). Aspects described herein may enable the efficient identification of the interferer (and the interfering beam in some configurations) in a jamming scenario without incurring undue overhead.

Figure 6:
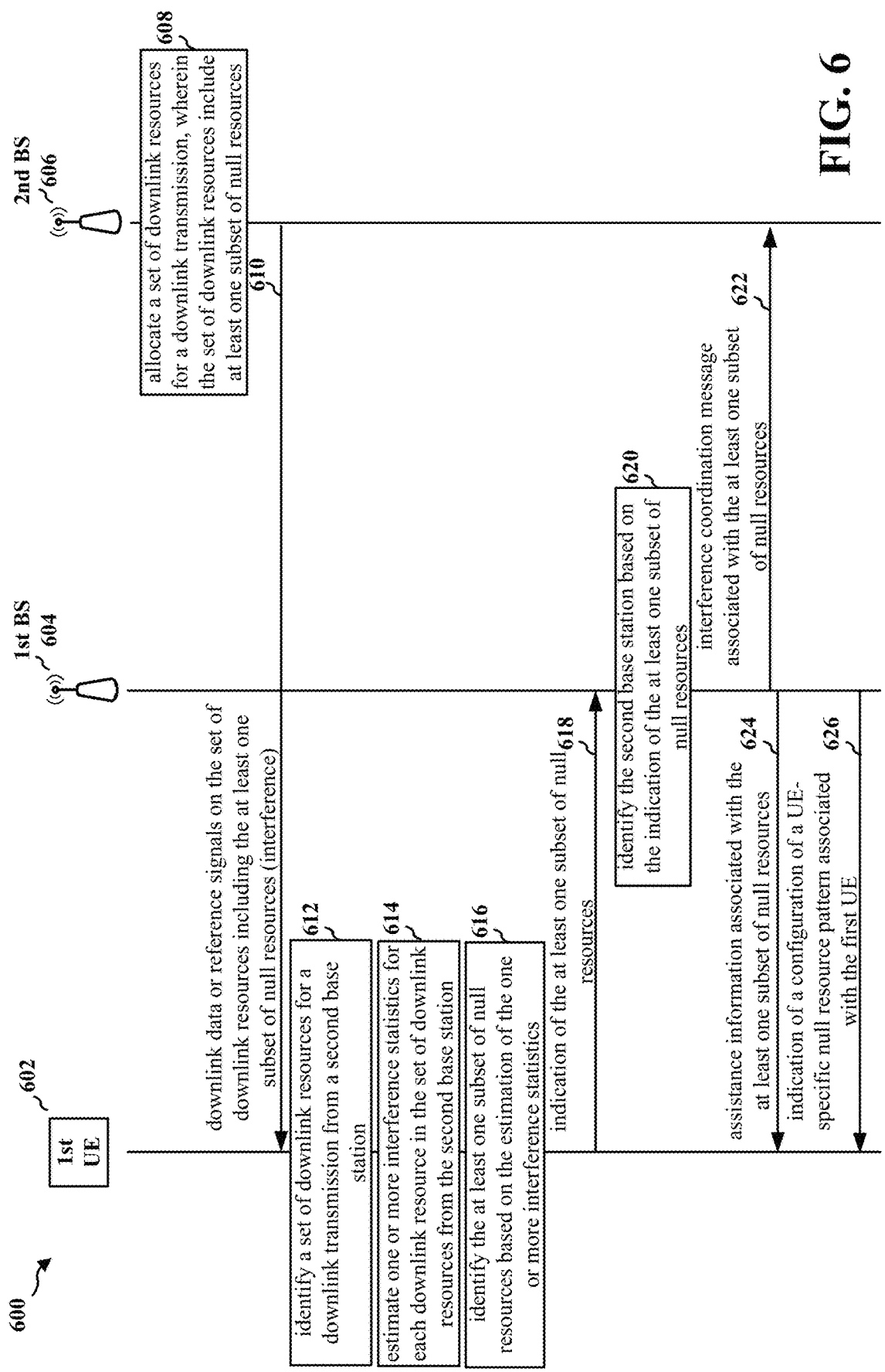
FIG. 6 is a diagram illustrating a communication flow of a method of wireless communication.

FIG. 6 is a diagram illustrating a communication flow 600 of a method of wireless communication. The first UE 602 may correspond to the first UE 504 in FIGS. 5A and 5B. The first base station 604 may correspond to the first base station 502 in FIGS. 5A and 5B. The second base station 606 may correspond to the second base station 506 in FIGS. 5A and 5B. At 608, the second base station 606 may allocate a set of downlink resources for a downlink transmission. The set of downlink resources may include at least one subset of null resources. The at least one subset of null resources may correspond to a pattern of null resources, which may be unique to the second base station 606, and may serve as a signature for the second base station 606. At 610, the second base station 606 may transmit downlink data or reference signals on the set of downlink resources including the at least one subset of null resources. The first UE 602 may experience the downlink transmission at 610 from the second base station 606 as interference. At 612, the first UE 602 may identify the set of downlink resources for a downlink transmission from a second base station 606. At 614, the first UE 602 may estimate one or more interference statistics for each downlink resource in the set of downlink resources from the second base station 606. At 616, the first UE 602 may identify the at least one subset of null resources based on the estimation of the one or more interference statistics for each downlink resource in the set of downlink resources. At 618, the first UE 602 may transmit, to the first base station 604, and the first base station 604 may receive, from the first UE 602, based on the one or more interference statistics, an indication of the at least one subset of null resources in the set of downlink resources. At 620, the first base station 604 may identify the second base station 606 based on the indication of the at least one subset of null resources included in the set of downlink resources. At 622, the first base station 604 may transmit, to the second base station 606, and the second base station 606 may receive, from the first base station 604, an interference coordination message associated with the at least one subset of null resources included in the set of downlink resources. At 624, the first UE 602 may receive, from the first base station 604, and the first base station 604 may transmit, to the first UE 602, assistance information associated with the at least one subset of null resources. At 626, the first base station 604 may transmit, to the first UE 602, an indication of a configuration of a UE-specific null resource pattern associated with the first UE 602.

Figure 7:
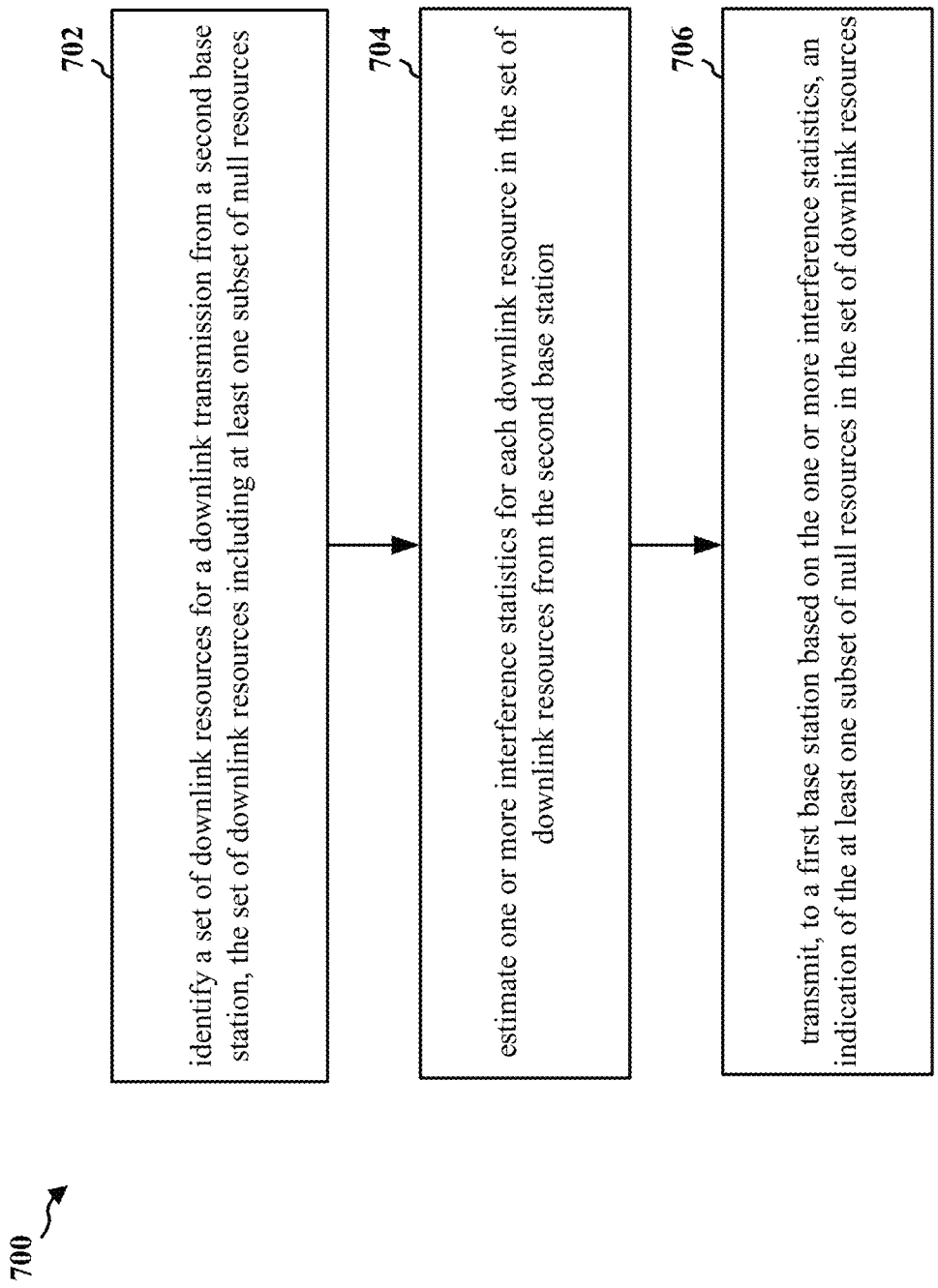
FIG. 7 is a flowchart of a method of wireless communication.

FIG. 7 is a flowchart 700 of a method of wireless communication. The method may be performed by a first UE (e.g., the UE 104/350; the first UE 602; the apparatus 1102). At 702, the first UE may identify a set of downlink resources for a downlink transmission from a second base station. The set of downlink resources may include at least one subset of null resources. For example, 702 may be performed by the interference coordination component 1140 in FIG. 11. Referring to FIG. 6, at 612, the first UE 602 may identify a set of downlink resources for a downlink transmission from a second base station 606.

At 704, the first UE may estimate one or more interference statistics for each downlink resource in the set of downlink resources from the second base station. For example, 704 may be performed by the interference coordination component 1140 in FIG. 11. Referring to FIG. 6, at 614, the first UE 602 may estimate one or more interference statistics for each downlink resource in the set of downlink resources from the second base station 606.

At 706, the first UE may transmit, to a first base station based on the one or more interference statistics, an indication of the at least one subset of null resources in the set of downlink resources. For example, 706 may be performed by the interference coordination component 1140 in FIG. 11. Referring to FIG. 6, at 618, the first UE 602 may transmit, to a first base station 604 based on the one or more interference statistics, an indication of the at least one subset of null resources in the set of downlink resources.

Figure 8:
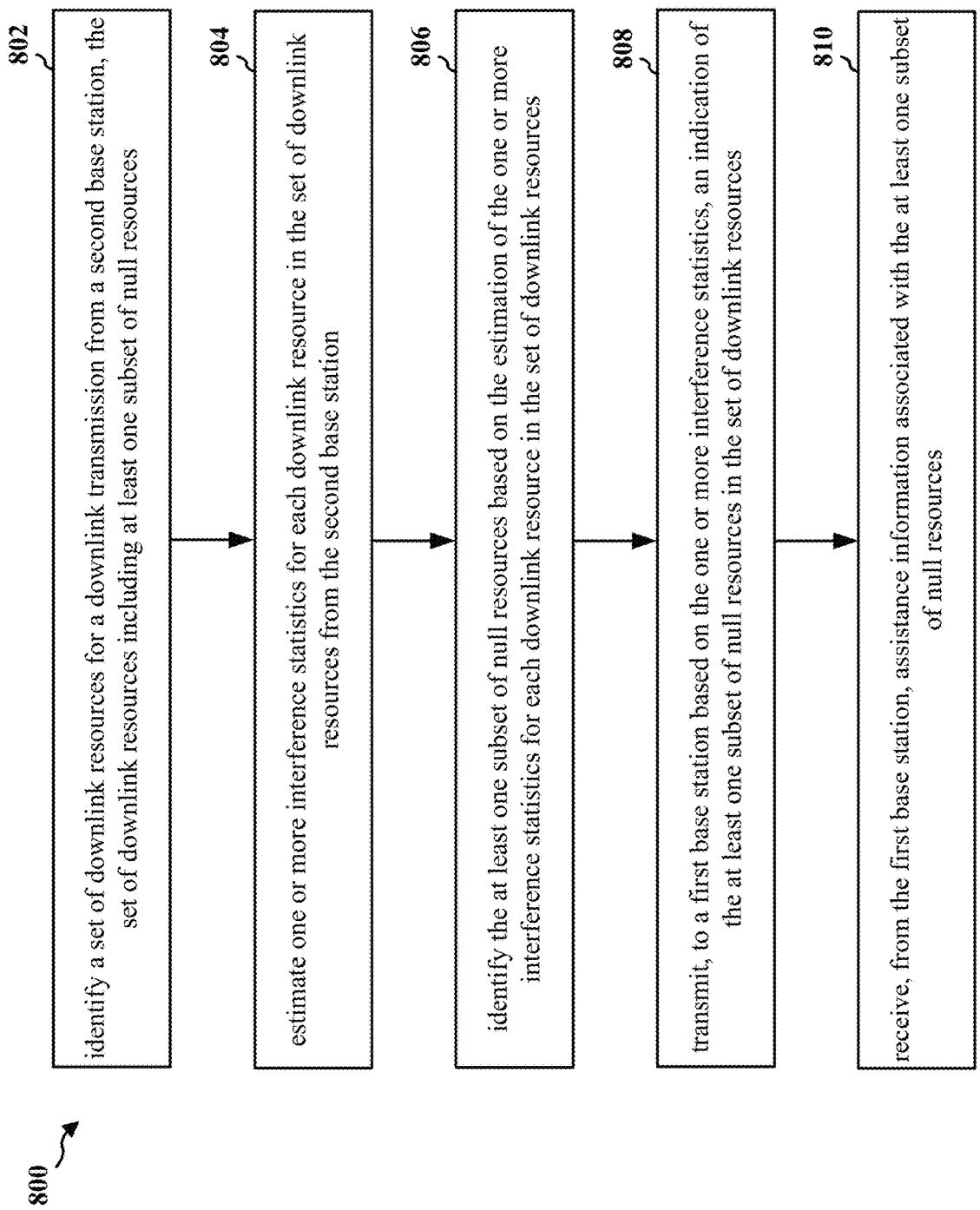
FIG. 8 is a flowchart of a method of wireless communication.

FIG. 8 is a flowchart 800 of a method of wireless communication. The method may be performed by a first UE (e.g., the UE 104/350; the first UE 602; the apparatus 1102). At 802, the first UE may identify a set of downlink resources for a downlink transmission from a second base station. The set of downlink resources may include at least one subset of null resources. For example, 802 may be performed by the interference coordination component 1140 in FIG. 11. Referring to FIG. 6, at 612, the first UE 602 may identify a set of downlink resources for a downlink transmission from a second base station 606.

At 804, the first UE may estimate one or more interference statistics for each downlink resource in the set of downlink resources from the second base station. For example, 804 may be performed by the interference coordination component 1140 in FIG. 11. Referring to FIG. 6, at 614, the first UE 602 may estimate one or more interference statistics for each downlink resource in the set of downlink resources from the second base station 606.

At 808, the first UE may transmit, to a first base station based on the one or more interference statistics, an indication of the at least one subset of null resources in the set of downlink resources. For example, 808 may be performed by the interference coordination component 1140 in FIG. 11. Referring to FIG. 6, at 618, the first UE 602 may transmit, to a first base station 604 based on the one or more interference statistics, an indication of the at least one subset of null resources in the set of downlink resources.

In one configuration, the downlink transmission may be transmitted on the set of downlink resources from the second base station to a second UE.

In one configuration, the downlink transmission may correspond to downlink data or one or more reference signals transmitted from the second base station to the second UE.

In one configuration, the downlink transmission may include at least one of a DMRS, a CSI-RS, or data.

In one configuration, the at least one subset of null resources may correspond to at least one pattern of null resources.

In one configuration, the at least one subset of null resources may correspond to the second base station.

In one configuration, the at least one subset of null resources may further correspond to at least one of a precoder, a PMI, an analog beam, or the second UE.

In one configuration, the set of downlink resources may correspond to a set of downlink beams.

In one configuration, at 806, the first UE may identify the at least one subset of null resources based on the estimation of the one or more interference statistics for each downlink resource in the set of downlink resources. For example, 806 may be performed by the interference coordination component 1140 in FIG. 11. Referring to FIG. 6, at 616, the first UE 602 may identify the at least one subset of null resources based on the estimation of the one or more interference statistics for each downlink resource in the set of downlink resources.

In one configuration, at 810, the first UE may receive, from the first base station, assistance information associated with the at least one subset of null resources. For example, 810 may be performed by the interference coordination component 1140 in FIG. 11. Referring to FIG. 6, at 624, the first UE 602 may receive, from the first base station 604, assistance information associated with the at least one subset of null resources.

In one configuration, the assistance information may correspond to a lookup table including a cell ID of the second base station.

In one configuration, the set of downlink resources may be associated with one of a tone level granularity or a resource block level granularity.

In one configuration, the one or more interference statistics may include at least one of a total interference power across one or more antennas, an interference covariance matrix, or CQI.

Figure 9:
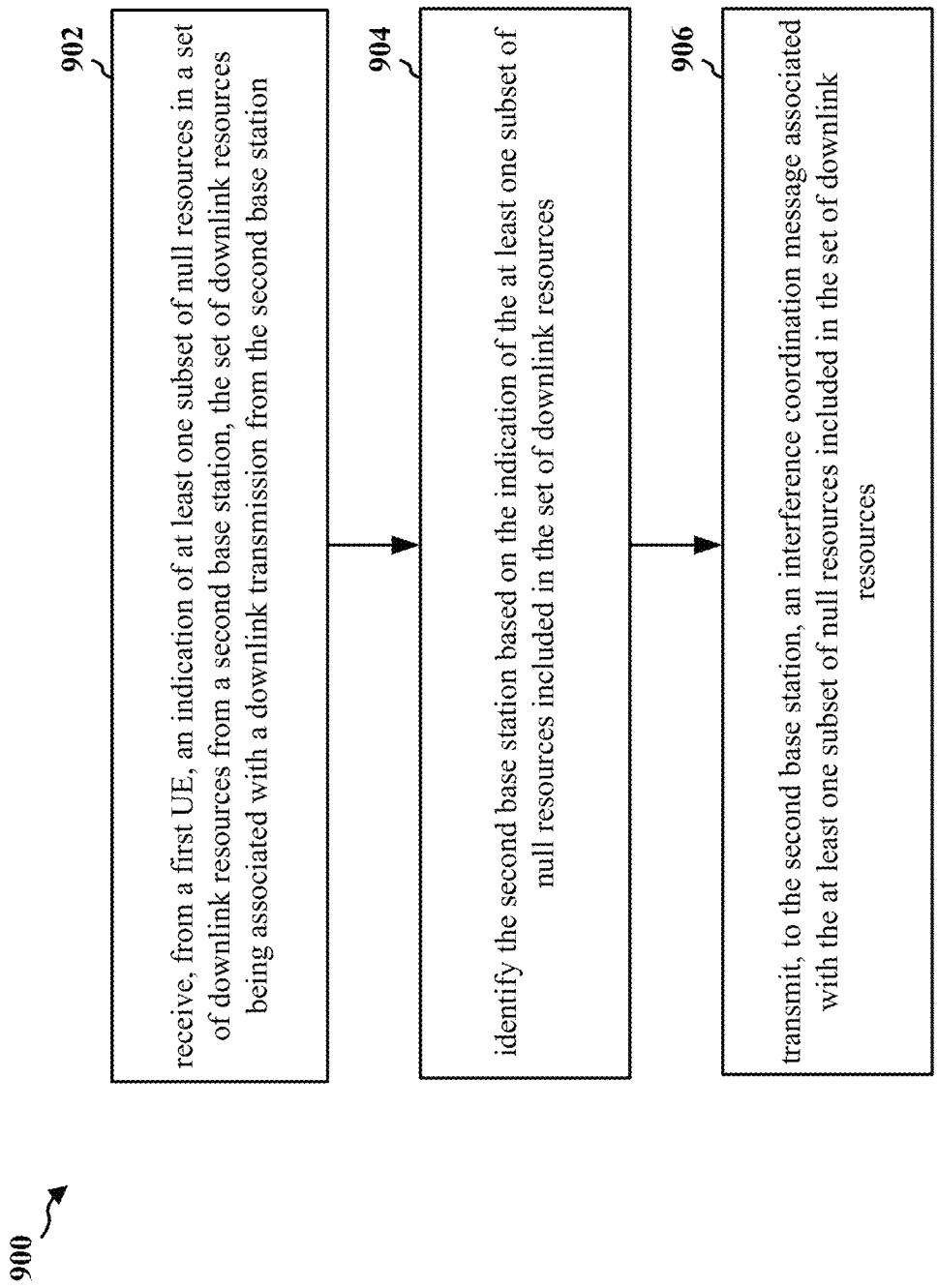
FIG. 9 is a flowchart of a method of wireless communication.

FIG. 9 is a flowchart 900 of a method of wireless communication. The method may be performed by a first base station (e.g., the base station 102/180/310; the first base station 604; the apparatus 1202). At 902, the first base station may receive, from a first UE, an indication of at least one subset of null resources in a set of downlink resources from a second base station. The set of downlink resources may be associated with a downlink transmission from the second base station. For example, 902 may be performed by the interference coordination component 1240 in FIG. 12. Referring to FIG. 6, at 618, the first base station 604 may receive, from a first UE 602, an indication of at least one subset of null resources in a set of downlink resources from a second base station.

At 904, the first base station may identify the second base station based on the indication of the at least one subset of null resources included in the set of downlink resources. For example, 904 may be performed by the interference coordination component 1240 in FIG. 12. Referring to FIG. 6, at 620, the first base station 604 may identify the second base station 606 based on the indication of the at least one subset of null resources included in the set of downlink resources.

At 906, the first base station may transmit, to the second base station, an interference coordination message associated with the at least one subset of null resources included in the set of downlink resources. For example, 906 may be performed by the interference coordination component 1240 in FIG. 12. Referring to FIG. 6, at 622, the first base station 604 may transmit, to the second base station 606, an interference coordination message associated with the at least one subset of null resources included in the set of downlink resources.

Figure 10:
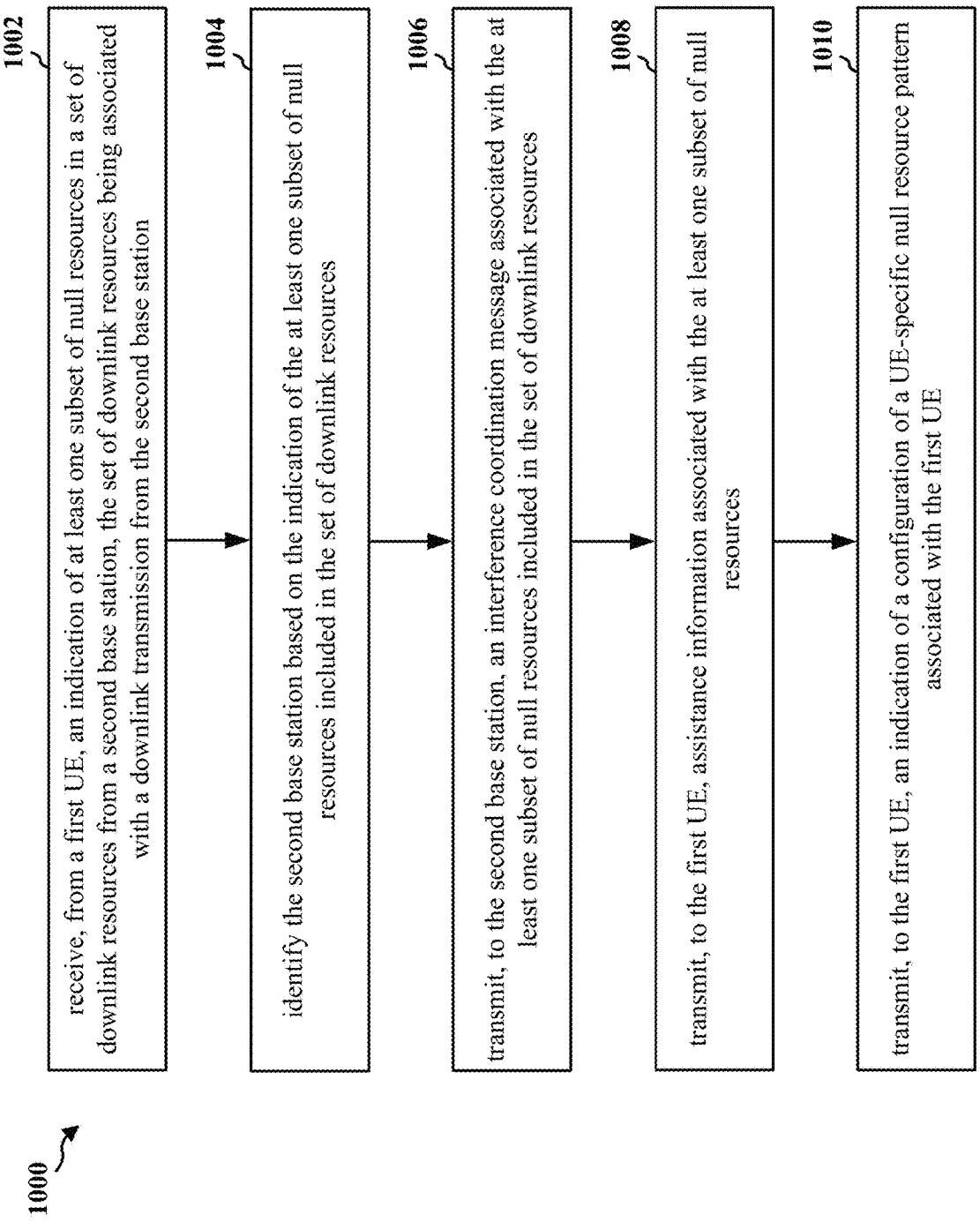
FIG. 10 is a flowchart of a method of wireless communication.

FIG. 10 is a flowchart 1000 of a method of wireless communication. The method may be performed by a first base station (e.g., the base station 102/180/310; the first base station 604; the apparatus 1202). At 1002, the first base station may receive, from a first UE, an indication of at least one subset of null resources in a set of downlink resources from a second base station. The set of downlink resources may be associated with a downlink transmission from the second base station. For example, 1002 may be performed by the interference coordination component 1240 in FIG. 12. Referring to FIG. 6, at 618, the first base station 604 may receive, from a first UE 602, an indication of at least one subset of null resources in a set of downlink resources from a second base station.

At 1004, the first base station may identify the second base station based on the indication of the at least one subset of null resources included in the set of downlink resources. For example, 1004 may be performed by the interference coordination component 1240 in FIG. 12. Referring to FIG. 6, at 620, the first base station 604 may identify the second base station 606 based on the indication of the at least one subset of null resources included in the set of downlink resources.

At 1006, the first base station may transmit, to the second base station, an interference coordination message associated with the at least one subset of null resources included in the set of downlink resources. For example, 1006 may be performed by the interference coordination component 1240 in FIG. 12. Referring to FIG. 6, at 622, the first base station 604 may transmit, to the second base station 606, an interference coordination message associated with the at least one subset of null resources included in the set of downlink resources.

In one configuration, the downlink transmission may be transmitted on the set of downlink resources from the second base station to a second UE.

In one configuration, the downlink transmission may correspond to downlink data or one or more reference signals transmitted from the second base station to the second UE.

In one configuration, the downlink transmission may include at least one of a DMRS, a CSI-RS, or data.

In one configuration, the at least one subset of null resources may correspond to at least one pattern of null resources.

In one configuration, the at least one subset of null resources may correspond to the second base station.

In one configuration, the at least one subset of null resources may further correspond to at least one of a precoder, a PMI, an analog beam, or the second UE.

In one configuration, the set of downlink resources may correspond to a set of downlink beams.

In one configuration, at 1008, the first base station may transmit, to the first UE, assistance information associated with the at least one subset of null resources. For example, 1008 may be performed by the interference coordination component 1240 in FIG. 12. Referring to FIG. 6, at 624, the first base station 604 may transmit, to the first UE 602, assistance information associated with the at least one subset of null resources.

In one configuration, the assistance information may correspond to a lookup table including a cell ID of the second base station.

In one configuration, the set of downlink resources may be associated with one of a tone level granularity or a resource block level granularity.

In one configuration, at 1010, the first base station may transmit, to the first UE, an indication of a configuration of a UE-specific null resource pattern associated with the first UE. For example, 1010 may be performed by the interference coordination component 1240 in FIG. 12. Referring to FIG. 6, at 626, the first base station 604 may transmit, to the first UE 602, an indication of a configuration of a UE-specific null resource pattern associated with the first UE 602.

Figure 11:
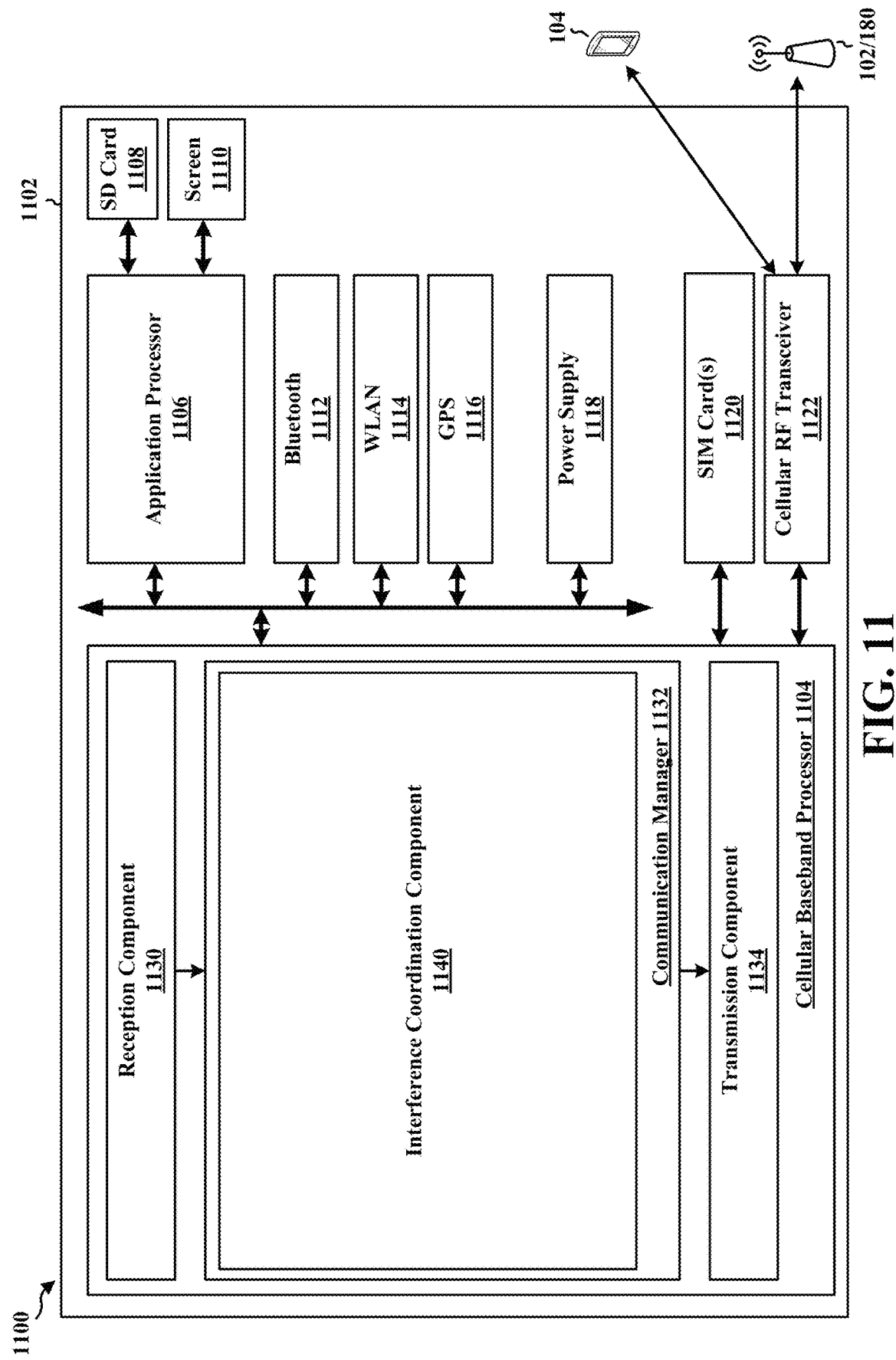
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an interference coordination component 1140 that may be configured to identify a set of downlink resources for a downlink transmission from a second base station, e.g., as described in connection with 702 in FIGS. 7 and 802 in FIG. 8. The interference coordination component 1140 may be configured to estimate one or more interference statistics for each downlink resource in the set of downlink resources from the second base station, e.g., as described in connection with 704 in FIGS. 7 and 804 in FIG. 8. The interference coordination component 1140 may be configured to identify the at least one subset of null resources based on the estimation of the one or more interference statistics for each downlink resource in the set of downlink resources, e.g., as described in connection with 806 in FIG. 8. The interference coordination component 1140 may be configured to transmit, to a first base station based on the one or more interference statistics, an indication of the at least one subset of null resources in the set of downlink resources, e.g., as described in connection with 706 in FIGS. 7 and 808 in FIG. 8. The interference coordination component 1140 may be configured to receive, from the first base station, assistance information associated with the at least one subset of null resources, e.g., as described in connection with 810 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for identifying a set of downlink resources for a downlink transmission from a second base station. The set of downlink resources may include at least one subset of null resources. The apparatus 1102 may include means for estimating one or more interference statistics for each downlink resource in the set of downlink resources from the second base station. The apparatus 1102 may include means for transmitting, to a first base station based on the one or more interference statistics, an indication of the at least one subset of null resources in the set of downlink resources.

In one configuration, the downlink transmission may be transmitted on the set of downlink resources from the second base station to a second UE. In one configuration, the downlink transmission may correspond to downlink data or one or more reference signals transmitted from the second base station to the second UE. In one configuration, the downlink transmission may include at least one of a DMRS, a CSI-RS, or data. In one configuration, the at least one subset of null resources may correspond to at least one pattern of null resources. In one configuration, the at least one subset of null resources may correspond to the second base station. In one configuration, the at least one subset of null resources may further correspond to at least one of a precoder, a PMI, an analog beam, or the second UE. In one configuration, the set of downlink resources may correspond to a set of downlink beams. In one configuration, the apparatus 1102 may include means for identifying the at least one subset of null resources based on the estimation of the one or more interference statistics for each downlink resource in the set of downlink resources. In one configuration, the apparatus 1102 may include means for receiving, from the first base station, assistance information associated with the at least one subset of null resources. In one configuration, the assistance information may correspond to a lookup table including a cell ID of the second base station. In one configuration, the set of downlink resources may be associated with one of a tone level granularity or a resource block level granularity. In one configuration, the one or more interference statistics may include at least one of a total interference power across one or more antennas, an interference covariance matrix, or CQI.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
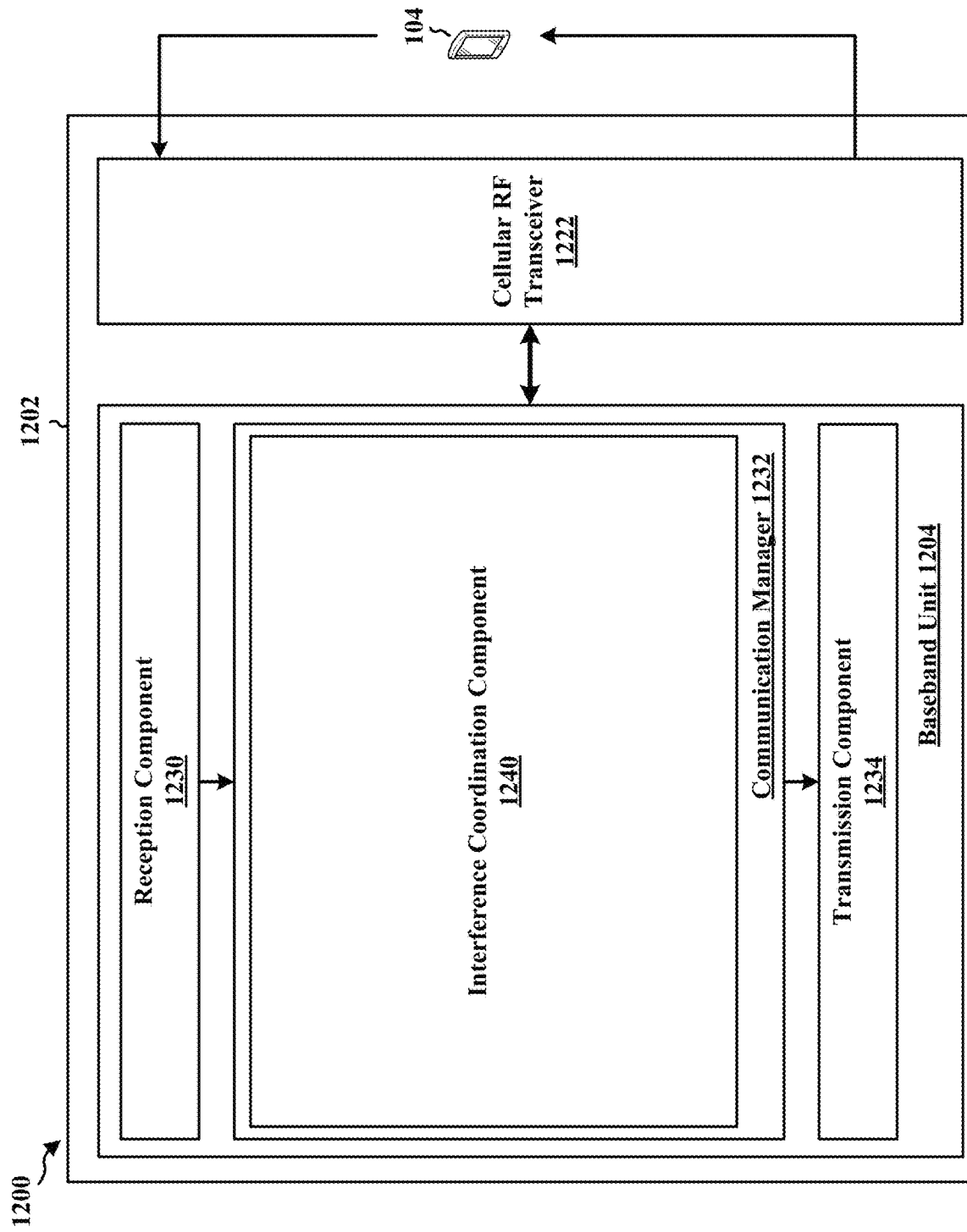
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an interference coordination component 1240 that may be configured to receive, from a first UE, an indication of at least one subset of null resources in a set of downlink resources from a second base station, e.g., as described in connection with 902 in FIGS. 9 and 1002 in FIG. 10. The interference coordination component 1240 may be configured to identify the second base station based on the indication of the at least one subset of null resources included in the set of downlink resources, e.g., as described in connection with 904 in FIGS. 9 and 1004 in FIG. 10. The interference coordination component 1240 may be configured to transmit, to the second base station, an interference coordination message associated with the at least one subset of null resources included in the set of downlink resources, e.g., as described in connection with 906 in FIGS. 9 and 1006 in FIG. 10. The interference coordination component 1240 may be configured to transmit, to the first UE, assistance information associated with the at least one subset of null resources, e.g., as described in connection with 1008 in FIG. 10. The interference coordination component 1240 may be configured to transmit, to the first UE, an indication of a configuration of a UE-specific null resource pattern associated with the first UE, e.g., as described in connection with 1010 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a first UE, an indication of at least one subset of null resources in a set of downlink resources from a second base station. The set of downlink resources may be associated with a downlink transmission from the second base station. The apparatus 1202 may include means for identifying the second base station based on the indication of the at least one subset of null resources included in the set of downlink resources. The apparatus 1202 may include means for transmitting, to the second base station, an interference coordination message associated with the at least one subset of null resources included in the set of downlink resources.

In one configuration, the downlink transmission may be transmitted on the set of downlink resources from the second base station to a second UE. In one configuration, the downlink transmission may correspond to downlink data or one or more reference signals transmitted from the second base station to the second UE. In one configuration, the downlink transmission may include at least one of a DMRS, a CSI-RS, or data. In one configuration, the at least one subset of null resources may correspond to at least one pattern of null resources. In one configuration, the at least one subset of null resources may correspond to the second base station. In one configuration, the at least one subset of null resources may further correspond to at least one of a precoder, a PMI, an analog beam, or the second UE. In one configuration, the set of downlink resources may correspond to a set of downlink beams. In one configuration, the apparatus 1202 may include means for transmitting, to the first UE, assistance information associated with the at least one subset of null resources. In one configuration, the assistance information may correspond to a lookup table including a cell ID of the second base station. In one configuration, the set of downlink resources may be associated with one of a tone level granularity or a resource block level granularity. In one configuration, the apparatus 1202 may include means for transmitting, to the first UE, an indication of a configuration of a UE-specific null resource pattern associated with the first UE.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described herein, a second base station may allocate a set of downlink resources for a downlink transmission. The set of downlink resources may include at least one subset of null resources, which may serve as a signature for the second base station. The second base station may transmit downlink data or reference signals on the set of downlink resources including the at least one subset of null resources. A first UE may experience the downlink transmission from the second base station as interference. The first UE may identify the set of downlink resources for the downlink transmission from a second base station. The first UE may identify the at least one subset of null resources based on the estimation of the one or more interference statistics for each downlink resource in the set of downlink resources. The first UE may transmit, to a first base station, based on the one or more interference statistics, an indication of the at least one subset of null resources in the set of downlink resources. The first base station may identify the second base station based on the indication of the at least one subset of null resources included in the set of downlink resources. The first base station may transmit, to the second base station, an interference coordination message associated with the at least one subset of null resources included in the set of downlink resources. Aspects described herein may enable the employment of interference coordination in a controlled manner (e.g., when a jamming scenario is detected). Aspects described herein may enable the efficient identification of the interferer (and the interfering beam in some configurations) in a jamming scenario without incurring undue overhead.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to identify a set of downlink resources for a downlink transmission from a second base station, the set of downlink resources including at least one subset of null resources; estimate one or more interference statistics for each downlink resource in the set of downlink resources from the second base station; and transmit, to a first base station based on the one or more interference statistics, an indication of the at least one subset of null resources in the set of downlink resources.

Aspect 2 is the apparatus of aspect 1, where the downlink transmission is transmitted on the set of downlink resources from the second base station to a second UE.

Aspect 3 is the apparatus of aspect 2, where the downlink transmission corresponds to downlink data or one or more reference signals transmitted from the second base station to the second UE.

Aspect 4 is the apparatus of any of aspects 1 to 3, where the downlink transmission includes at least one of a DMRS, a CSI-RS, or data.

Aspect 5 is the apparatus of any of aspects 1 to 4, where the at least one subset of null resources corresponds to at least one pattern of null resources.

Aspect 6 is the apparatus of any of aspects 1 to 5, where the at least one subset of null resources corresponds to the second base station.

Aspect 7 is the apparatus of aspect 6, where the at least one subset of null resources further corresponds to at least one of a precoder, a PMI, an analog beam, or the second UE.

Aspect 8 is the apparatus of any of aspects 1 to 7, where the set of downlink resources corresponds to a set of downlink beams.

Aspect 9 is the apparatus of any of aspects 1 to 8, the at least one processor being further configured to: identify the at least one subset of null resources based on the estimation of the one or more interference statistics for each downlink resource in the set of downlink resources.

Aspect 10 is the apparatus of any of aspects 1 to 9, the at least one processor being further configured to: receive, from the first base station, assistance information associated with the at least one subset of null resources.

Aspect 11 is the apparatus of aspect 10, where the assistance information corresponds to a lookup table including a cell ID of the second base station.

Aspect 12 is the apparatus of any of aspects 1 to 11, where the set of downlink resources is associated with one of a tone level granularity or a resource block level granularity.

Aspect 13 is the apparatus of any of aspects 1 to 12, where the one or more interference statistics include at least one of a total interference power across one or more antennas, an interference covariance matrix, or CQI.

Aspect 14 is the apparatus of any of aspects 1 to 13, further including a transceiver coupled to the at least one processor.

Aspect 15 is an apparatus for wireless communication at a first base station including at least one processor coupled to a memory and configured to receive, from a first UE, an indication of at least one subset of null resources in a set of downlink resources from a second base station, the set of downlink resources being associated with a downlink transmission from the second base station; identify the second base station based on the indication of the at least one subset of null resources included in the set of downlink resources; and transmit, to the second base station, an interference coordination message associated with the at least one subset of null resources included in the set of downlink resources.

Aspect 16 is the apparatus of aspect 15, where the downlink transmission is transmitted on the set of downlink resources from the second base station to a second UE.

Aspect 17 is the apparatus of aspect 16, where the downlink transmission corresponds to downlink data or one or more reference signals transmitted from the second base station to the second UE.

Aspect 18 is the apparatus of any of aspects 15 to 17, where the downlink transmission includes at least one of a DMRS, a CSI-RS, or data.

Aspect 19 is the apparatus of any of aspects 15 to 18, where the at least one subset of null resources corresponds to at least one pattern of null resources.

Aspect 20 is the apparatus of any of aspects 15 to 19, where the at least one subset of null resources corresponds to the second base station.

Aspect 21 is the apparatus of aspect 20, where the at least one subset of null resources further corresponds to at least one of a precoder, a PMI, an analog beam, or the second UE.

Aspect 22 is the apparatus of any of aspects 15 to 21, where the set of downlink resources corresponds to a set of downlink beams.

Aspect 23 is the apparatus of any of aspects 15 to 22, the at least one processor being further configured to: transmit, to the first UE, assistance information associated with the at least one subset of null resources.

Aspect 24 is the apparatus of aspect 23, where the assistance information corresponds to a lookup table including a cell ID of the second base station.

Aspect 25 is the apparatus of any of aspects 15 to 24, where the set of downlink resources is associated with one of a tone level granularity or a resource block level granularity.

Aspect 26 is the apparatus of any of aspects 15 to 25, the at least one processor being further configured to: transmit, to the first UE, an indication of a configuration of a UE-specific null resource pattern associated with the first UE.

Aspect 27 is the apparatus of any of aspects 15 to 26, further including a transceiver coupled to the at least one processor.

Aspect 27 is a method of wireless communication for implementing any of aspects 1 to 27.

Aspect 28 is an apparatus for wireless communication including means for implementing any of aspects 1 to 27.

Aspect 29 is a computer-readable medium storing computer executable code, where the code when executed by a processor causes the processor to implement any of aspects 1 to 27.

What is claimed is:

1. An apparatus for wireless communication at a first user equipment (UE), comprising:
    memory; and
    at least one processor coupled to the memory and configured to:
        receive a configuration comprising a particular pattern associated with a second base station, wherein the particular pattern is based on index coding associated with a set of base stations including the second base station and associated with an identity of the second base station;
        receive, from the second base station, a downlink transmission based on a set of downlink resources as interference;
        identify the set of downlink resources for the downlink transmission from the second base station based on the particular pattern being present in at least one subset of null resources in the set of downlink resources and identify the second base station based on the particular pattern being present;
        estimate one or more interference statistics for each downlink resource in the set of downlink resources from the second base station; and
        transmit, to a first base station based on the one or more interference statistics, an indication of the at least one subset of null resources in the set of downlink resources.

2. The apparatus of claim 1, wherein the downlink transmission is configured to be transmitted on the set of downlink resources from the second base station to a second UE.

3. The apparatus of claim 2, wherein the downlink transmission corresponds to downlink data or one or more reference signals transmitted from the second base station to the second UE.

4. The apparatus of claim 1, wherein the downlink transmission includes at least one of a demodulation reference signal (DMRS), a channel state information (CSI)-reference signal (RS) (CSI-RS), or data.

5. The apparatus of claim 1, wherein the at least one subset of null resources corresponds to the particular pattern.

6. The apparatus of claim 1, wherein the at least one subset of null resources corresponds to the second base station.

7. The apparatus of claim 6, wherein the at least one subset of null resources further corresponds to at least one of a precoder, a precoding matrix indicator (PMI), an analog beam, or a second UE.

8. The apparatus of claim 1, wherein the set of downlink resources corresponds to a set of downlink beams.

9. The apparatus of claim 1, the at least one processor being further configured to:
    identify the at least one subset of null resources based on the estimation of the one or more interference statistics for each downlink resource in the set of downlink resources.

10. The apparatus of claim 1, the at least one processor being further configured to:
    receive, from the first base station, assistance information associated with the at least one subset of null resources.

11. The apparatus of claim 10, wherein the assistance information corresponds to a lookup table including a cell identifier (ID) of the second base station.

12. The apparatus of claim 1, wherein the set of downlink resources is associated with one of a tone level granularity or a resource block level granularity.

13. The apparatus of claim 1, wherein the one or more interference statistics include at least one of a total interference power across one or more antennas, an interference covariance matrix, or channel quality information (CQI).

14. The apparatus of claim 1, further comprising a transceiver coupled to the at least one processor.

15. A method of wireless communication at a first user equipment (UE), comprising:
    receiving a configuration comprising a particular pattern associated with a second base station, wherein the particular pattern is based on index coding associated with a set of base stations including the second base station and associated with an identity of the second base station;
    receive, from the second base station, a downlink transmission based on a set of downlink resources as interference;
    identifying the set of downlink resources for the downlink transmission from the second base station based on the particular pattern being present in at least one subset of null resources in the set of downlink resources and identifying the second base station based on the particular pattern being present;
    estimating one or more interference statistics for each downlink resource in the set of downlink resources from the second base station; and
    transmitting, to a first base station based on the one or more interference statistics, an indication of the at least one subset of null resources in the set of downlink resources.

16. An apparatus for wireless communication at a first base station, comprising:
    memory; and
    at least one processor coupled to the memory and configured to:
        receive, from a first user equipment (UE), an indication of at least one subset of null resources in a set of downlink resources from a second base station, the set of downlink resources being associated with a downlink transmission from the second base station, wherein the indication comprises a particular pattern associated with the at least one subset of null resources, wherein the particular pattern is based on index coding associated with a set of base stations including the second base station and associated with an identity of the second base station;
        identify the second base station based on the indication of the at least one subset of null resources included in the set of downlink resources; and transmit, to the second base station, an interference coordination message associated with the at least one subset of null resources included in the set of downlink resources.

17. The apparatus of claim 16, wherein the downlink transmission is configured to be transmitted on the set of downlink resources from the second base station to a second UE.

18. The apparatus of claim 17, wherein the downlink transmission corresponds to downlink data or one or more reference signals transmitted from the second base station to the second UE.

19. The apparatus of claim 16, wherein the downlink transmission includes at least one of a demodulation reference signal (DMRS), a channel state information (CSI)-reference signal (RS) (CSI-RS), or data.

20. The apparatus of claim 16, wherein the at least one subset of null resources corresponds to the particular pattern.

21. The apparatus of claim 16, wherein the at least one subset of null resources corresponds to the second base station.

22. The apparatus of claim 21, wherein the at least one subset of null resources further corresponds to at least one of a precoder, a precoding matrix indicator (PMI), an analog beam, or a second UE.

23. The apparatus of claim 16, wherein the set of downlink resources corresponds to a set of downlink beams.

24. The apparatus of claim 16, the at least one processor being further configured to:
transmit, to the first UE, assistance information associated with the at least one subset of null resources.

25. The apparatus of claim 24, wherein the assistance information corresponds to a lookup table including a cell identifier (ID) of the second base station.

26. The apparatus of claim 16, wherein the set of downlink resources is associated with one of a tone level granularity or a resource block level granularity.

27. The apparatus of claim 16, the at least one processor being further configured to:
transmit, to the first UE, an indication of a configuration of a UE-specific null resource pattern associated with the first UE.

28. The apparatus of claim 16, further comprising a transceiver coupled to the at least one processor.

29. A method of wireless communication at a first base station, comprising:
receiving, from a first user equipment (UE), an indication of at least one subset of null resources in a set of downlink resources from a second base station, the set of downlink resources being associated with a downlink transmission from the second base station, wherein the indication comprises a particular pattern associated with the at least one subset of null resources, wherein the particular pattern is based on index coding associated with a set of base stations including the second base station and associated with an identity of the second base station;
identifying the second base station based on the indication of the at least one subset of null resources included in the set of downlink resources; and
transmitting, to the second base station, an interference coordination message associated with the at least one subset of null resources included in the set of downlink resources.

30. The method of claim 29, wherein the downlink transmission is transmitted on the set of downlink resources from the second base station to a second UE.

* * * * *